United States Patent [19]

Kani

[11] Patent Number: 4,731,659
[45] Date of Patent: Mar. 15, 1988

[54] SLOW MOTION REPRODUCING APPARATUS

[75] Inventor: Tetsuo Kani, Kanagawa, Japan

[73] Assignee: Sony Corporation, Tokyo, Japan

[21] Appl. No.: 791,108

[22] Filed: Oct. 24, 1985

[30] Foreign Application Priority Data

Oct. 26, 1984 [JP] Japan .................................. 59-226274

[51] Int. Cl.[4] .............................................. H04N 5/783
[52] U.S. Cl. .................................... 358/312; 360/10.1; 360/75
[58] Field of Search ................... 358/312; 360/8–10.3, 360/75, 77, 78, 106, 107, 109

[56] References Cited

U.S. PATENT DOCUMENTS

| 4,163,993 | 8/1979 | Ravizza | 360/77 X |
| 4,215,362 | 7/1980 | Ravizza | 360/77 X |
| 4,445,145 | 4/1984 | Moriya | 360/10.2 |

FOREIGN PATENT DOCUMENTS 0017284 1/1982 Japan .................................. 360/10.1

Primary Examiner—Robert L. Richardson
Attorney, Agent, or Firm—Lewis H. Eslinger

[57] ABSTRACT

A slow motion reproducing apparatus in which a dynamic tracking head dynamically traces slant recording tracks sequentially formed on a tape in its longitudinal direction while the tape is transported at variable tape speed to thereby reproduce a video signal from the recording tracks is disclosed, which includes head displacement amount specifying means for specifying a head displacement amount so as to make the dynamic tracking head trace the specified track on the basis of a tracking track information for specifying a track that the dynamic tracking head should trace and a head position information indicative of the position of the dynamic tracking head. In this case, the slow motion reproducing apparatus further includes video signal data storing means and address control means for storing in the video signal data storing means at its memory area corresponding to a corresponding track a video signal which can be reproduced from the corresponding track and which is recorded in the track that the dynamic tracking head traces.

9 Claims, 33 Drawing Figures

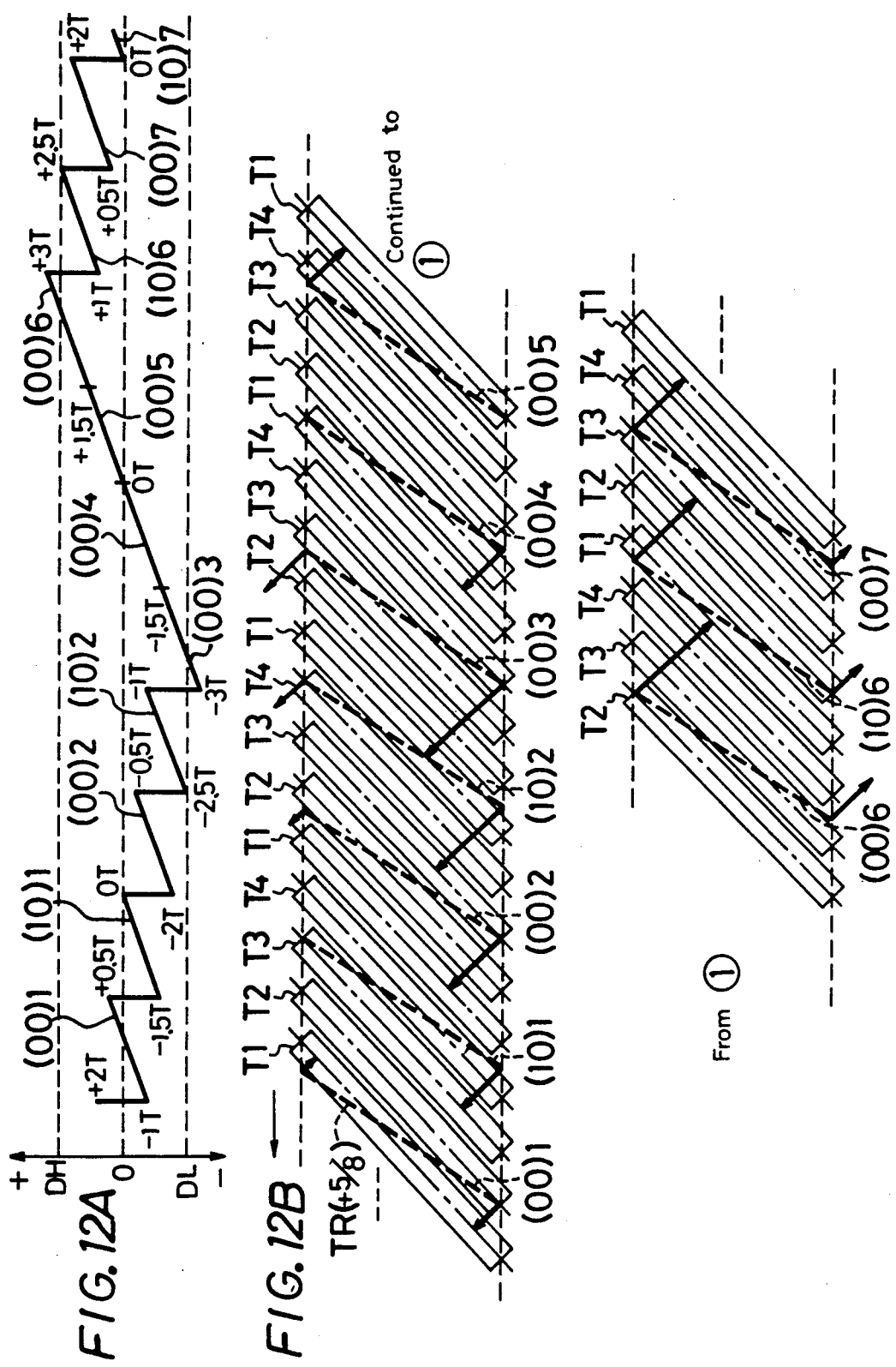

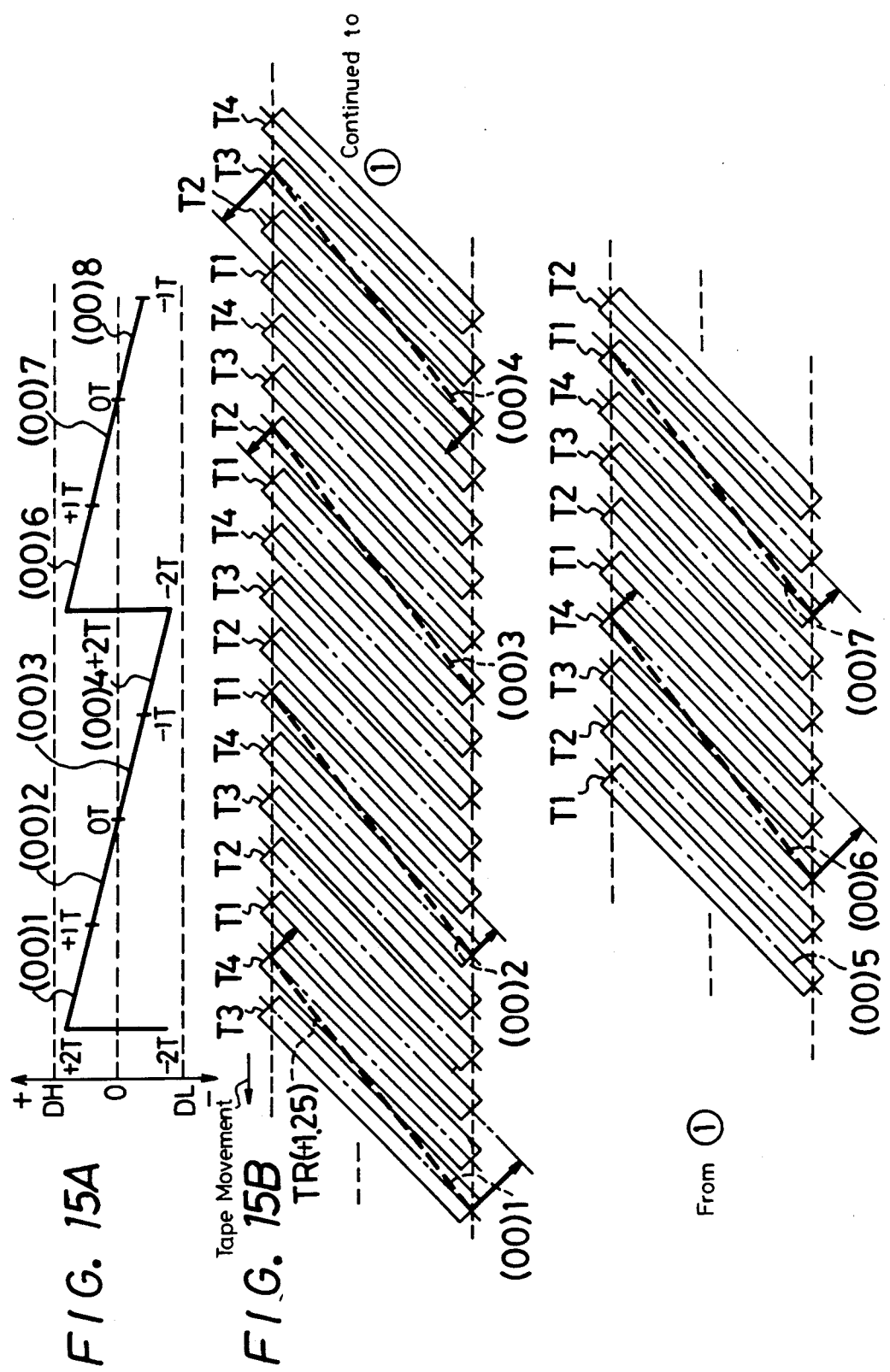

SLOW MOTION REPRODUCING APPARATUS

BACKGROUND OF THE INVENTION

1. Field of the Invention

The present invention generally relates to a reproduced video signal processing apparatus and, more particularly, is directed to a slow motion reproducing appratus for reproducing a video signal from recording tracks which are formed obliquely on a magnetic tape so as to be sequentially arranged in the longitudinal direction thereof.

2. Description of the Prior Art

A video tape recorder (VTR) of helical scan type is known as the slow motion reproducing apparatus of this kind. For example, in the proposed VTR for recording and/or reproducing a high definition television video signal, the television video signal is separated into four component signals (G1, G2, B and R signals) and these four video signals are sequentially recorded on adjacent four tracks T1 to T4 simultaneously as shown in FIG. 1.

In order to reproduce the respective component signals from such recording tracks, four playback heads assigned to the tracks T1 to T4 are tracked to trace the corresponding tracks simultaneously so that a composite video signal must be reproduced by composing the reproduced video signals derived from the respective playback heads as required. To this end, the VTR is so formed that if while the tape is transported, for example, at normal speed, the tape is reproduced under normal mode and after each playback head traces the corresponding track once from its lower end edge (tracing start end) to its upper end edge (tracing stop end) toward the head tracing direction, it traces the succeeding track, it is tracked to trace the lower end edge of the track formed at the position distant apart by 4 tracks from the above traced track.

Some VTRS for reproducing an information recorded on a magnetic tape by a plurality of heads have a so-called shuttle mode in which while the tape running direction and the tape running speed are both varied, a picture is reproduced. In this case, if the tape is transported at other speed than the normal speed (that is, the same speed as the tape speed upon recording mode), the tracing locus drawn on the magnetic tape by the position of the playback head attached to a magnetic drum does not coincide with the angle of each track in its longitudinal direction and crosses each track.

More particularly, in the shuttle mode, upon normal playback mode in which the tape is transported at normal tape speed, each head traces the track assigned to each head (this is called a corresponding track) as shown by reference numeral TRN in FIG. 1. However, upon playback mode with variable tape speeds in which the tape is transported at tape speed, for example, twice the normal one in the forward direction, the head draws a tracing locus TR(+2) which crosses four tracks in the direction opposite to the tape transport direction by the trace; upon still mode in which the tape stops running, the head draws a tracing locus TRS which crosses four tracks in the width direction of the tape; and upon reverse mode with tape speed ½ times the normal tape speed in which the tape is transported at, for example, tape speed ½ times the normal tape speed in the reverse direction, the head draws a tracing locus TR(−½) which crosses six tracks in the direction opposite to that of the normal playback mode.

In practice, in the shuttle mode, the tape running speed can be varied continuously so that it is necessary that when any tracing locus is designated over a range from the tracing locus TR(−½) of the reverse mode with tape speed ½ times the normal tape speed to the tracing locus TR(+2) of the playback mode with tape speed twice the normal tape speed, each head is tracked on the corresponding track correctly whereby to reproduce the component video signal without any dropout.

In practice, each component video signal thus reproduced is stored once in a field memory provided in a reproduced video signal processing apparatus (for example, a time base corrector), then read out at a predetermined timing and then composed as the composite video signal.

A dynamic tracking head (hereinafter simply DT head) is used to enable each reproducing head to be tracked on the corresponding track by which the head is displaced in the direction perpendicular to the tracing direction by the displaced amount of the tracing locus of the head attaching position from the corresponding track.

However, when the plurality of, for example, four playback heads, discribed in connection with FIG. 1, are tracked by using the DT heads to trace the corresponding tracks in the shuttle mode, the displaced amount of the DT heads become extremely large, while the displacing amount of the DT head, which can be manufactured in practice, is limited by a relatively small amount. As a result, it is very difficult for the plurality of heads to carry out the dynamic tracking operation simultaneously by using such DT heads the dynamic tracking function of which is limited.

For instance, the track width of the corresponding track of each playback head is about 60 $\mu$m and the track pitch becomes around 357 $\mu$m. Whereas, in order to carry out the dynamic tracking playback over the range from the still mode to the variable speed playback mode with the tape speed twice the normal tape speed, it becomes necessary to provide a DT head whose movable range covers more than 714 $\mu$m as a peak-to-peak value. However, the range in which the displacement amount (the stroke of the peak-to-peak value) of the DT head provided in practice is linear is around 700 $\mu$m. If the displacement amount exceeds this range, the stability of the dynamic tracking operation is lost. Accordingly, it is not considered practical to make the DT head carry out the dynamic tracking operation in one tracing over a full range from the still mode to the variable speed playback mode with tape speed twice the normal tape speed.

In addition, as the drive mechanism (generally a bimorph leaf is used) for the plurality of (four) heads to carry out the dynamic tracking operation, it is necessary to provide such a bimorph leaf which has the strength corresponding to the weight of the head, the resonance frequency and the flyback time upon the jump mode. It is, however, difficult to obtain such ideal bimorph leaf in practice.

OBJECTS AND SUMMARY OF THE INVENTION

Accordingly, it is an object of this invention to provide a slow motion reproducing apparatus which can reproduce a reproduced video signal, which is sufficiently satisfactory, even when a tape speed is changed in a wide range just like a shuttle mode.

It is another object of this invention to provide a slow motion reproducing apparatus, in which even when the dynamic tracking function of a DT (dynamic tracking) head has a movable range which can not satisfy the above-mentioned conditions, the DT head can operate sufficiently in accordance with each tape running condition in a shuttle mode so that a reproduced video signal can be positively reproduced without each head losing the recording information of a corresponding track.

According to one aspect of the present invention, there is provided a slow motion reproducing apparatus in which a DT head dynamically traces a slant recording track formed sequentially on a tape at its longitudinal direction while the tape is transported at variable tape speed, to thereby reproduce a video signal from the recording track, the slow motion reproducing apparatus includes head displacement amount specifying means for specifying a displacement amount so as to make the dynamic tracking head trace the specified track on the basis of a tracking track information TTI for specifying a track to be traced by the dynamic tracking head and a head position information PSI indicative of the position of the dynamic tracking head.

In addition to the displacement amount specifying means, the slow motion reproducing apparatus of the invention further includes address control means for storing in video signal data storing means at its memory area corresponding to a range of a reproduced video signal a video signal recorded on a track tracked by the dynamic tracking head on the basis of the displacement amount specified by the displacement amount specifying means and the tracking track information TTI.

According to the circuit arrangement as mentioned above, when the tape running speed is varied over a wide range, the displacement amount of the dynamic tracking head can be determined so as to become suitable for the above displacement amount so that a video signal data recorded on the corresponding track that should be reproduced can be reproduced positively.

Consequently, since the memory area in which the reproduced video signal data is stored can be specified in response to the range that is reproduced by the dynamice tracking head, it becomes possible to reproduce the video signal from the storing means correctly.

These and other objects, features and advantages of the present invention will become apparent from the following detailed description of the preferred embodiment taken in conjunction with the accompanying drawings, throughout which like reference numerals designate like elements and parts.

BRIEF DESCRIPTION OF THE DRAWINGS

FIGS. 5A, 5B to FIGS. 18A, 18B are respectively diagrams showing the operation modes of the DT head upon various modes.

DESCRIPTION OF THE PREFERRED EMBODIMENTS

Now, the present invention will hereinafter be described in detail with reference to the attached drawings.

Figure 2:
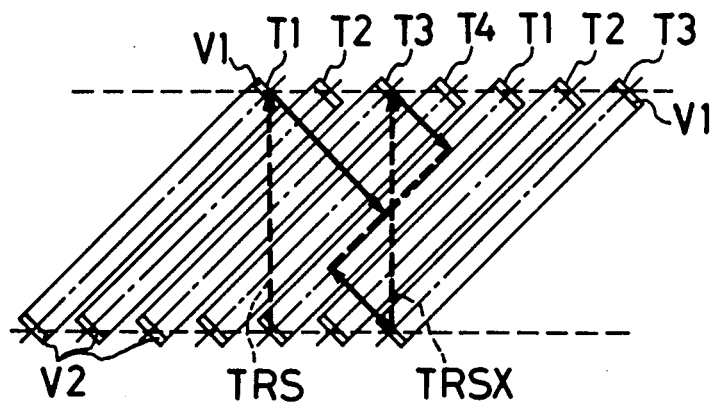
FIG. 2 is a diagram useful for explaining the dynamic tracking operation of a DT (dynamic tracking) head.
Figure 3:
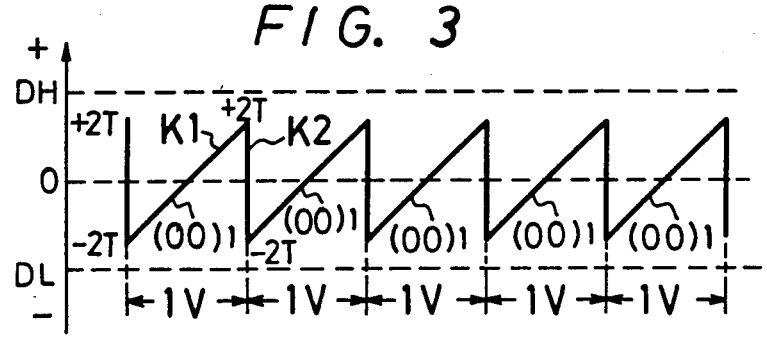
FIG. 3 is a diagram showing the jump format of the DT head.

FIGS. 2 and 3 are respectively diagrams showing the state in which the playback head corresponding to the first track T1 carries out the dynamic tracking operation in the still mode. As shown in FIGS. 2 and 3, the playback head attaching position on the drum, or the position (hereinafter, zero displacement position) of the playback head when the DT head is not displaced may be considered to sequentially cross the adjacent three tracks T4, T3 and T2 thereby to draw a tracing locus over the range of the 4 tracks (this tracing locus is called zero displacement tracing locus). On the other hand, in order that the DT head is dynamically tracked on the corresponding track T1, the tracking head must be displaced so as to cross the four tracks as shown by a solid line arrow in FIG. 2. If the tracing locus TRS is displaced to the position intersecting the central portion of the corresponding track T1 as shown by the tracing locus TRSX in FIG. 2 and then the dynamic tracking operation is carried out, the change of the displaced amount of the DT head can be obtained, as shown in FIG. 3, in the displacement amount of the peak-to-peak (namely in a range from the upper limit displacement DH to the lower limit displacement DL) as the displacement of the positive direction (direction to the upper limit displacement DH) and the displacement of the negative direction (direction to the lower limit displacement DL) with the reference position of the zero displacement amount as the center.

Thus the tolerance displacement range of the dynamic tracking head can be utilized effectively.

If the zero displacement tracing locus is formed at the position at which the tracing locus TRSX crosses the corresponding track T1 when the DT head has the zero displacement amount, the displacement amounts of the DT head in the positive and negative directions can be expressed by the unit of track interval between the adjacent tracks.

To be more concrete, if the DT head traces the corresponding track T1 shown in FIG. 2 in a dynamic tracking mode at, for example, a timing corresponding to one vertical synchronizing signal interval 1V of the video signal, the displacement amount of the DT head can be expressed by a straight line K1 in FIG. 3, in which the DT head is displaced by two track amounts in the negative direction at the tracing start end of the corresponding track T1 (this displacement is represented as 2T). This displacement amount rectilinearly decreases until the DT head moves to the central position of the corresponding track T1 and becomes zero when the DT head arrives at the central position of the track T1. If from this state the DT head traces toward the direction of the tracing stop end, the displacement smount of the DT head is rectilinearly increased in the positive direction from the state of the zero displacement.

Consequently, the DT head is displaced from the position displaced by two tracks in the negative direction (the displacement amount −2T corresponding to the distance between the tracks T1 and T3) with the corresponding track T1 as the reference to the position of the zero displacement (the DT head is tracked on the corresponding track T1). The DT head is further displaced by two tracks (the displacement amount +2T corresponding to the distance from the tracks T1 to T3) in the positive direction.

However, since the tape is stopped in running, after the reproducing head passes the tracing stop end of the corresponding track T1, the DT head has to be tracked on the tracing start end of the same corresponding track T1, once again. To this end, the DT head changes its displacement from the displacement amount (+2T) at the tracing stop end to the displacement amount (−2T) at the tracing start end in a short time of period. In other words, when the tracing of one vertical synchronizing period 1V is ended, the DT head changes its displacement amount by 4 track amounts (this is called 4-track jump) by one time.

Such operation is repeated at every vertical synchronizing interval 1V, whereby the DT head is dynamically tracked on corresponding track so that the recorded video signal of one field amount is repeatedly reproduced, thus a still picture being reproduced.

In practice, the upper limit displacement DH and the lower limit displacement DL in FIG. 3 are respectively selected as values lower than the upper limit and the lower limit of the displacement limit of the bimorph leaf by the distance (about 90 μm) of nearly one track amount so that in the succeeding jump, the bimorph leaf is prevented from exceeding the displacement limit thereof.

Figure 4:
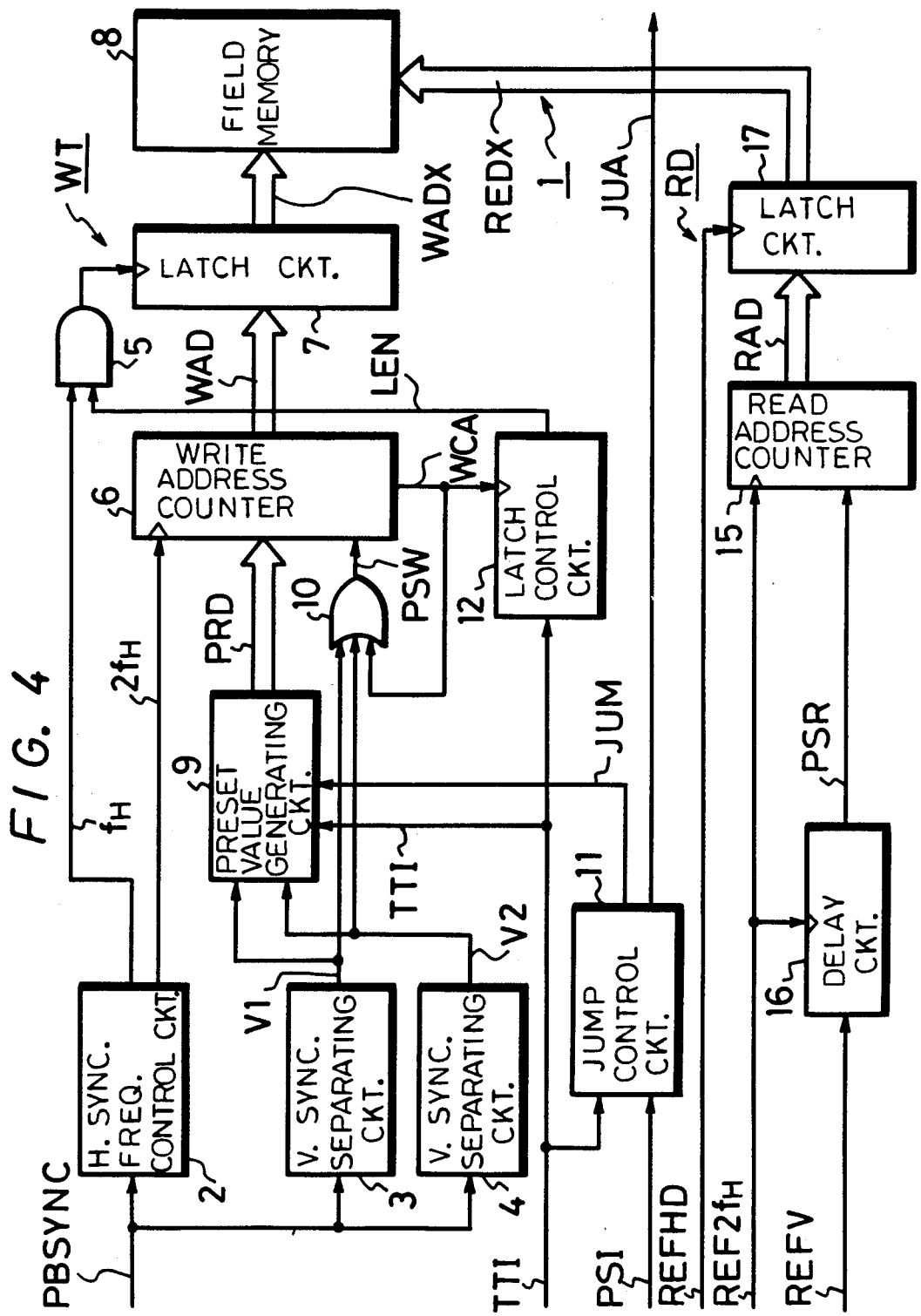
FIG. 4 is a block diagram showing an embodiment of a slow motion reproducing apparatus according to this invention.

The reproduced video signal played back from the corresponding track as mentioned above is supplied to a reproduced signal processing circuit 1 shown in FIG. 4. A reproduced synchronizing signal PBSYNC is extracted therefrom and this reproduced synchronizing signal PBSYNC is then supplied to a horizontal synchronizing frequency control circuit 2 and to first and second vertical synchronizing separating circuits 3 and 4 in a write address signal system WT.

The horizontal synchronizing frequency control circuit (horizontal AFC) 2 separates the horizontal synchronizing signal from the reproduced synchronizing signal PBSYNC and produces a horizontal synchronizing frequency output $f_H$ formed of a continuous wave which is not affected by the horizontal synchronizing signal even if the dropout occurs in the horizontal synchronizing signal. This horizontal synchronizing frequency output $f_H$ is supplied to a two-input AND circuit 5. The horizontal AFC circuit 2 also produces a synchronizing output $2f_H$ with the frequency twice the horizontal synchronizing frequency output $f_H$ which is supplied to a write address counter 6.

The write address counter 6 functions to latch the count content thereof to a latch circuit 7 as a write address signal WAD indicative of the start address of each horizontal scanning line. The write address of a field memory 8 is specified by a latch output WADX from the latch circuit 7. The field memory 8 is adapted to sequentially write therein a video data of one horizontal scanning line at its address which sequentially increments from the above write address.

Figure 1:
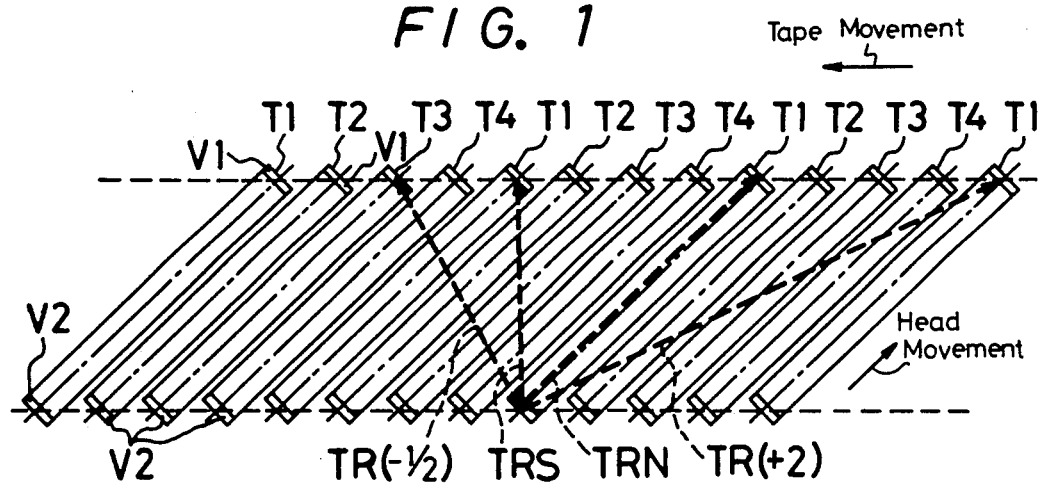
FIG. 1 as a diagram showing a tracing locus formed on a recording track by a playback head upon shuttle mode.

In this embodiment of the invention, as shown in FIGS. 1 and 2, vertical synchronizing signals V1 and V2 are separately recorded on the tracing start end portion and the tracing stop end portion of each of the tracks T1 to T4 respectively.

The vertical synchronizing signals V1 and V2 are respectively separated by the vertical synchronizing separating circuits 3 and 4 and then fed to a preset value generating circuit 9. The reason why the vertical synchronizing signals V1 and V2 are inserted into the both end portions of each track is as follows. When the DT head performs the dynamic tracking operation in accordance with the change of the tape running condition in the shuttle mode, the range, in which the DT head can trace in practice, is fluctuated and one of the vertical synchronizing signals can not be reproduced, it can be interpolated by another one. The vertical synchronizing signals V1 and V2 separated by the vertical synchronizing separating circuits 3 and 4 are supplied through an OR circuit 10 to the write address counter 6 as a preset signal PSW, whereby a preset data PRD derived from the preset value generating circuit 9 is loaded in the write address counter 6.

The preset value generating circuit 9 functions to produce the preset data PRD by which the video signal data picked up from the corresponding track by the DT head is written in the memory area corresponding to the position on the track from which the video signal data is practically picked up. For this reason, the preset value generating circuit 9 receives the vertical synchronizing signals V1 and V2 from the vertical synchronizing separating circuit 3 and 4, a tracking track information TTI for specifying the track that the head now traces, and a jump track information JUM of the DT head. All of these informations are used as the conditions for specifying the memory area, in which the video data of one field amount is to be written, suitable for the dynamic tracking operation that is carried out at present. On the basis of these conditions, the preset value generating circuit 9 produces the preset data PRD.

The tracking track information TTI is the information of 2 bits which indicates the displacement amount of the track that is traced at present relative to the corresponding track that should be reproduced upon normal playback mode. When the DT head traces the corresponding track, the tracking track information TTI takes a logic "00". When on the other hand the track is displaced by 1, 2 and 3 track amounts in the direction opposite to the tape running direction upon normal playback mode, the tracking track information TTI takes logics "01", "10" and "11", respectively.

The jump track information JUM is produced from a jump control circuit 11. The jump control circuit 11 receives a position information PSI indicative of the mechanical position of the DT head when it is not displaced (that is, the zero displacement position) and the above tracking track information TTI and determines the jump direction and the jump amount of the DT head when the succeeding one vertical synchronizing interval arrives. Then, the jump control circuit 11 supplies the data indicative of the above jump direction and the jump amount to the preset value generating circuit 9 as the jump track information JUM and supplies to a dynamic tracking control circuit (not shown) a jump drive signal JUA which is used to carry out the jump operation. In this case, the jump control circuit 11 includes a judging reference data so that the DT head can trace the corresponding track once during any 1V interval without fail. Thus it is possible to reproduce the video signal of the corresponding track without fail.

When the DT head is placed in the state to be able to trace the corresponding track, the tracking track information TTI becomes the logic "00" indicative of the fact that the DT head is not displaced from the corresponding track. At that time, the tracking track information TTI controls a latch control circuit 12 so as to produce a latch enable signal LEN. The latch enable signal LEN is supplied to the two-input AND circuit 5 which then supplies the horizontal synchronizing frequency output $f_H$ to the latch circuit 7 as the clock signal. Accordingly, the write address signal WAD from the write address counter 6 at the time when the DT head traces the corresponding track is latched in the latch circuit 7, whereby the field memory 8 starts writing the video signal data.

Thereafter, when the content of the tracking track information TTI is changed from "00", the latch control circuit 12 is controlled so as not to produce the latch enable signal LEN and correspondingly, the latch circuit 7 is supplied with no horizontal synchronizing frequency output $f_H$ so that the latch circuit 7 does not carry out the latch operation any more and the field memory 8 stops writing the video signal data.

In this embodiment, a carry output WCA from the write address counter 6 is fed back through the OR circuit 10 to the write address counter 6 as the preset signal PSW thereof. Thus, when the write address counter 6 finishes up a series of write address operations, it can be preset to the intial value by this preset signal PSW. Accordingly, when the both vertical synchronizing signals V1 and V2 are not produced any more while the tape running state is being varied, if the write address counter 6 is preset to its initial value by the carry output WCA, the write address signal WAD can be continuously produced from the write address counter 6.

The video signal data written in the field memory 8 at every scanning line is read out therefrom by a read latch output REDX obtained from a read address signal system RD. The read address system RD includes a read address counter 15 which is supplied with a reference synchronizing output $REF2f_H$ as a clock signal thereof. A delay circuit 16 produces a preset signal PSR for the read address counter 15 by delaying a reference vertical synchronizing signal REFV by a predetermined delay time. Then, the count content of the read address counter 15 is fed to a latch circuit 17 as a read address signal RAD.

The latch circuit 17 is supplied with a reference horizontal synchronizing signal REFHD as the latch signal thereof. Accordingly, the latch circuit 17 latches the read address signal RAD at every period of the reference horizontal synchronizing signal REFHD having the stable period and supplies the read latch output REDX to the field memory 8 as the read address signal thereof.

As described above, according to the reproduced signal processing circuit 1 shown in FIG. 4, the reproduced video signal data can be stored in the field memory 8 on the basis of the write address signal WAD, the timing of which is fluctuated, produced in synchronism with the jitter component of the produced video signal on the basis of the reproduced synchronizing signal PBSYNC and the reproduced video signal data thus stored in the field memory 8 can be read out therefrom on the basis of the reference horizontal synchronizing signal REFHD having the stable period so that the time base of the reproduced video signal can be corrected.

In consequence, when the tape running states (the tape transport direction and the tape speed) are desirably changed as required just like the shuttle mode, if the four DT heads are jump-controlled during one vertical synchronizing signal period (this is called 1V period) in following thereto as required and the write address signal WAD for the field memory 8 is produced in synchronism therewith, the reproduced video signal data reproduced from the corresponding tracks by the respective DT heads can positively be stored in the field memory 8 at its memory areas corresponding to the positions on the tracks at which the video signal data are picked up.

Subsequently, an explanation will be given on the operation of the write address signal system WT under respective states of the shuttle mode, such as when the tape is changed from the still mode in the positive direction to the tape speed twice the normal tape speed and when the tape is changed from the still mode in the reverse direction to the tape speed $-\frac{1}{2}$ times the normal tape speed.

In the following case, with regard to the DT head, the peak-to-peak displacement amount between the upper limit displacement DH and the lower limit displacement DL described in connection with FIG. 3 is six track amounts, the upper limit displacement position relative to the displacement position when the DT head is not displaced, namely, the zero displacement position is 3.5 track amounts (this is represented as +3.5T) and the lower limit displacement DL relative to the zero displacement position is 2.5 track amounts (hereinafter represented as −2.5T). Accordingly, when the DT head is displaced up to the position over the upper limit displacement DH or the lower limit displacement DL with the zero displacement position as the reference, the DT head must be controlled so as to return within the tolerance range (that is, the range from the upper limit displacement DH to the lower limit displacement DL) in the next jump operation. The jump amount of the DT head is controlled by the jump control circuit 11 in FIG. 4.

While in the embodiment of the four DT heads, the DT head corresponding to the first track T1 will be described below, it is needless to say that other three DT heads corresponding to other tracks T2 to T4 are operated in like manner.

(1) Still mode

The still mode is such a mode in which the tape is stopped running and the corresponding track is repeatedly traced during the 1V period. In this case, as shown in FIGS. 5B and 6B which are made corresponding to FIG. 1, since the tracing locus TRS of the zero displacement position of the DT head (this is called zero displacement tracing locus) is such the locus which crosses four track amounts, the DT head carries out the dynamic tracking operation to correct the crossing operation by displacing itself by four track amounts during the 1V interval. At the same time, when the 1V interval is ended, the DT head carries out the jump operation by the displacement amount of 4-track amounts and then returns to the original position.

Figure 5A:
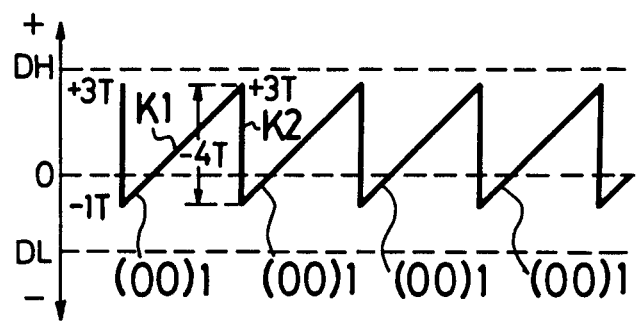
Figure 5B:
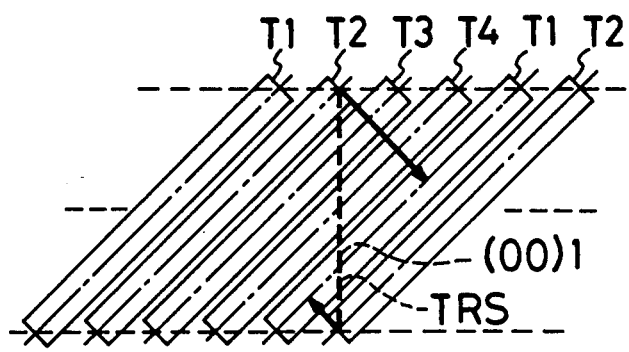
Figure 6A:
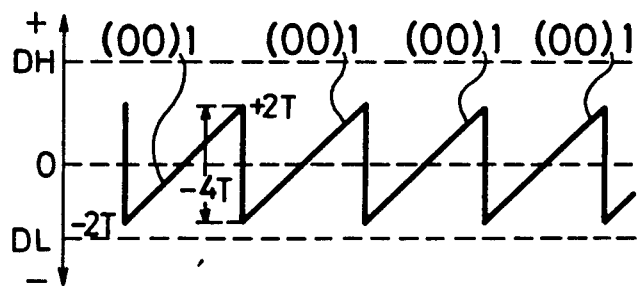
Figure 6B:
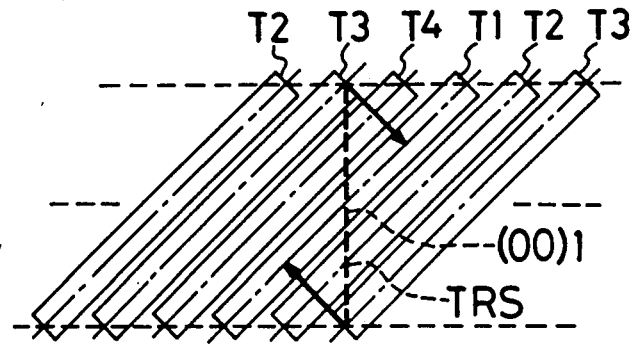

In order to carry out such operation within the tolerance displacement range (the range from the upper limit displacement DH to the lower limit displacement DL), two dynamic tracking operations may be considered as the jump format of the DT head, which are shown in FIGS. 5A and 6A each being made corresponding to FIG. 3.

In the case of FIG. 5A, the reference position of the DT head is taken as the corresponding track T1, the DT head is displaced from −1T to +3T during the IV interval and when the 1V interval is ended, the DT head is jumped by 4-track amounts, namely, −4T from the tracing stop displacement position +3T to the next tracing start displacement position −1T. At that time, the zero displacement tracing locus TRS is formed at the position to cross the corresponding tracing track T1 as shown in FIG. 5B.

Accordingly, in the reproduced signal processing circuit 1 (FIG. 4), the content of the tracking track information TTI indicative of the track that is now being tracked becomes "00" and the DT head position information PSI indicative of the zero displacement position of the DT head indicates the zero displacement tracing locus TRS so that the jump control circuit 11 supplies the DT head displacement drive signal JUA to the DT head drive apparatus to displace the DT head from the zero displacement position by the displacement amount along, the straight line K1 shown in FIG. 5A. Consequently, as shown by an arrow in FIG. 5B, the DT head is displacement from the zero displacement tracing locus TRS to the specified track "00", i.e., T1 to trace the same so that the video signal is reproduced from the corresponding track T1.

In FIGS. 5A and 5B, the specified content of the tracking track information TTI indicates by using "(00)1" one (that is, "(00)1") of the corresponding tracks "00". Accordingly, when the corresponding track to be tracked is changed, such track is indicated by adding the numeral "1" to "00". Other tracks will be indicated similarly.

Generally, the range in which the DT head can trace the track T1 is changed in accordance with the tape speed and is limited to a part of the corresponding track in the still mode as shown in FIG. 5B. Therefore, in order to store the reproduced video signal in the range of the memory area corresponding to the above tracing range, the jump control circuit 11 supplies the jump track information JUM to the preset value generating circuit 9.

As a result, the DT head can reproduce the video signal from the corresponding track T1 corresponding to the range from the tracing start displacement position −1T to the tracing stop displacement position +3T and can sequentially store the reproduced video signal in the field memory 8 at its memory area corresponding to the above tracing range. This operation is repeated at every 1V interval.

Whereas, FIG. 6 shows the operation of a case in which the position of the zero displacement tracing locus TRS of the DT head is displaced as compared with the case of FIG. 5. In this case, except for the fact that the DT head is displaced in a range from the tracing start displacement position −2T to the tracing end displacement position +2T, the DT head is dynamically tracked on the corresponding track T1 thereby to reproduce the video signal similarly as in FIG. 5.

In this case, as will be clear from the comparison of FIG. 5B with FIG. 6B, the range in which the DT head can trace the corresponding track T1 is displaced to the position different from that of FIG. 5B. Accordingly, the jump control circuit 11 supplies the jum track information JUM corresponding to such change to the preset data generating circuit 9 to thereby change the preset data PRD so that the reproduced video data can be stored in the field memory 8 at its memory area corresponding to the range in which the DT head traces the corresponding track.

Figure 7A:
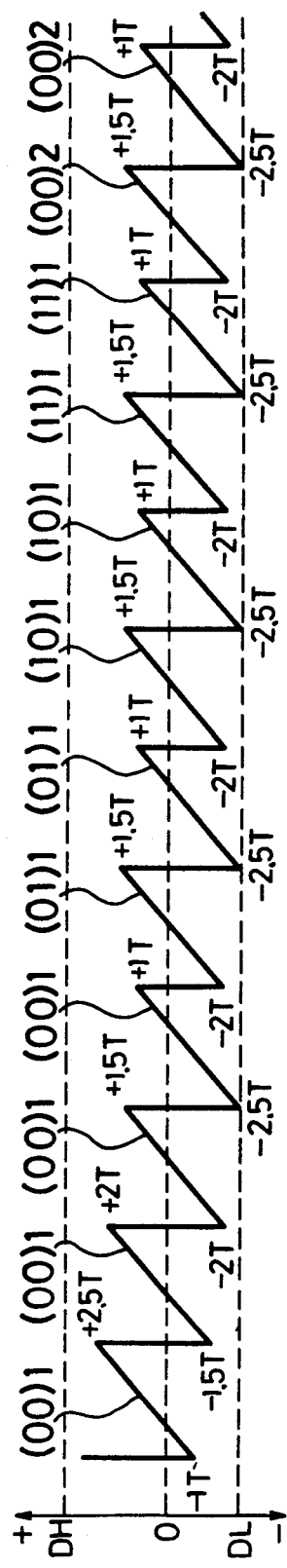
Figure 7B:
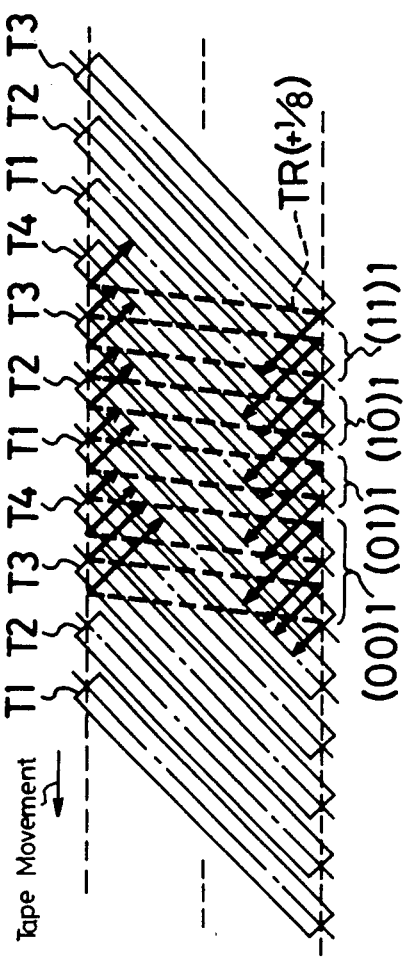

(2) Still mode to playback mode with tape speed $+\frac{1}{8}$ times the normal tape speed The playback mode with tape speed $+\frac{1}{8}$ times the normal tape speed will be described as a representative of this mode. In this case, the tape is transported in the positive direction by $\frac{1}{8}$ track amounts at every time the head carries out one tracing. Accordingly, the zero displacement tracing locus TR($+\frac{1}{8}$) is sequentially moved to the position corresponding to $\frac{1}{8}$ track intervals at every tracing of the head as shown in FIG. 7B. Under this state, in order to displace the DT head so as to satisfy the displacement tolerance range, if the DT head is displaced with the zero displacement position as the reference by a format as shown in FIG. 7A, the DT head can trace the corresponding track T1 with the sufficient tolerance.

In other words, the tracking track information TTI specifies the first corresponding track (00)1 and the DT head displacement drive signal JUA which causes the DT head to jump from the displacement stop position to the displacement start position by 4-track (that is, −4T) and the jump track information JUM are respectively produced from the jump control circuit 11.

Since the tape is moved in the positive direction by $\frac{1}{8}$ track amounts during every one tracing of the DT head, when the DT head reaches the displacement stop position and then jumps to the displacement start position by 4-track amounts, the zero displacement position of the DT head at the next tracing start time is displaced in the reverse direction (in the right-hand side direction in FIG. 7B) by $\frac{1}{8}$ track amounts. Thus, the displacement amount of the DT head relative to the corresponding track is displaced by $-\frac{1}{8}T$ each (FIG. 7A).

The displacement of the displaced amount is accumulated gradually and then is reached to the lower limit displacement (−2.5T). If this state is maintained thereafter, the displacement amount of the DT head exceeds the tolerance range so that the DT head can not carry out the jump operation. Therefore, the jump control circuit 11 detects the fact that the displacement amount of the DT head reaches the lower limit displacement DL and then changes the jump amount of the DT head at the next jump from 4 tracks to 3 tracks. At that time, the tracking track information TTI becomes such one so as to change the track to be traced from the corresponding track T1 to the adjacent track T2, the data is changed from the first track (00)1 to the second track (01)1. When such state is presented, the DT head is dynamically controlled to be tracked on the track T2 and to trace the track T2. However, at that time, since the reproduced video signal is reproduced from the other track than the track assigned to the DT head, in order to prevent this reproduced video signal from being stored in the field memory 8 the latch control circuit 12 is controlled by the tracking track information TTI so as to not deliver the latch enable signal LEN.

As a result, the DT head traces the track T2 in a range from the displacement start position −2T to the displacement stop position +1.5T and hence the displacement level of the DT head is returned to the positive direction by 0.5T.

When such tracing of the DT head is ended, the jump control circuit 11 returns the jump amount to −4T. Therefore, when the next tracing is started, the displacement start position of the DT head is again returned to the lower limit displacement −2.5T and the DT head traces the track 2T in a range from this position to the displacement stop position +1T. Then, the jump control circuit 11 changes again the jump amount, which is produced when this tracing is ended, to −3T.

When the second track T2 is traced twice as above, the tracing locus TR($+\frac{1}{8}$) of the zero displacement position of the DT head is moved to the position at which it can not trace the track T2 so that the tracking tracking information TTI changes to "00" to specify the third track T3. Then, the jump control circuit 11 produces the DT head displacement drive signal JUA and the jump track information JUM by which the DT head traces the specified track (10)1 in a range from the displacement start position −2T to the displacement stop position +1.5T.

In this way, the DT head is placed in the state to be dynamically tracked on the third track T3. In this case, since the reproduced video signal at that time is not the reproduced signal from the corresponding track, the latch control circuit 12 is controlled so as not to produce the latch enable signal LEN so that the above reproduced video signal can be prevented from being stored in the field memory 8.

In like manner, at every two tracings, the tracking track information TTI sequentially moves the track to be traced in the positive direction. In accordance therewith, at every one tracing, the jump control circuit 11 alternately changes over the jump amount of the DT head by 3-track amounts (−3T) or 4-track amounts (−4T) sequentially.

As described above, the DT head is dynamically and sequentially tracked on the tracks T1 to T4 with a jump amount within the jump tolerance range and reproduces the video signal from the respective tracks.

In the reproduced video signals, only the video signal reproduced from the corresponding track is stored in the field memory 8.

(3) Playback mode with tape speed +¼ times the normal tape speed

Figure 8A:
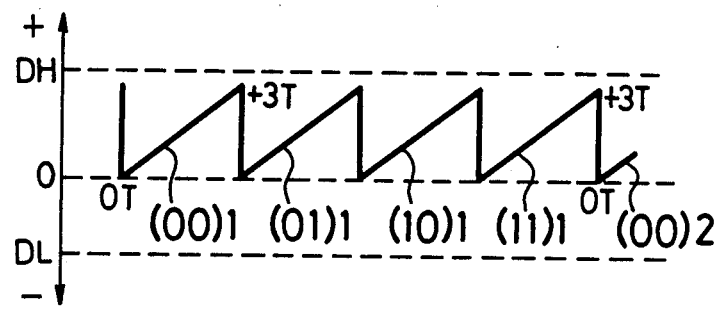
Figure 8B:
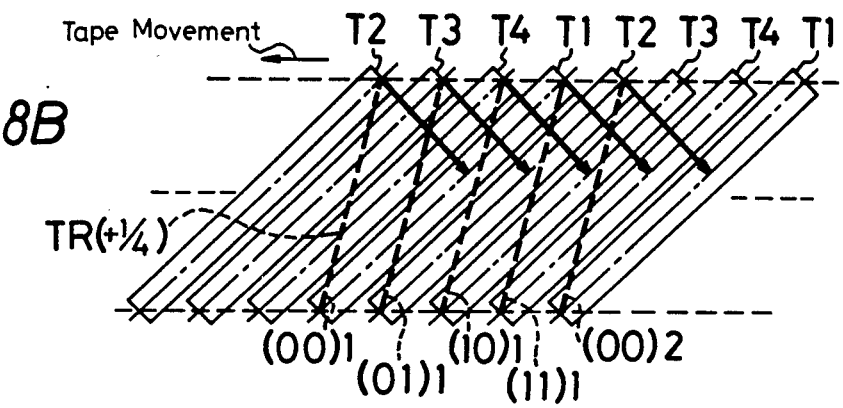

At that time, during one tracing of the DT head, the tape is transported in the positive direction by one track amount so that as shown in FIG. 8B, the zero displacement tracing locus TR(+¼) of the DT head crosses the recording track of 3 track amounts during one tracing period and the interval between the respective zero displacement tracing loci TR(+¼) becomes one track amount. At that time, the tracking track information TTI sequentially specifies (00)1, (01)1, (10)1, (11)1, (00)2, . . . as the tracks to be sequentially traced as shown in FIG. 8A. Thus, in order that the DT head sequentially traces the tracks T1, T2, T3, T4, T1, . . . , the jump control circuit 11 selects the jump amount of the DT head by 3-track amounts (−3T) from the displacement end position to the next displacement start position.

Accordingly, since the DT head is displaced by 3-track amounts between the zero displacement position and the +3T position, the video signals can be reproduced in the sequential order of the tracks T1, T2, T3, T4, T1, . . . In this case, the latch control circuit 12 functions such that only when the DT head traces the corresponding track T1, the reproduced video signal therefrom is stored in the field memory 8.

Figure 9A:
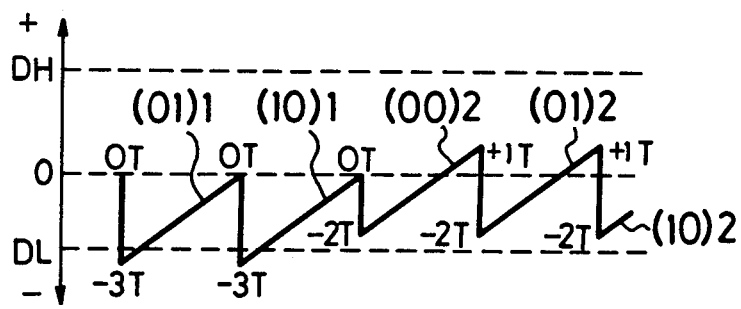
Figure 9B:
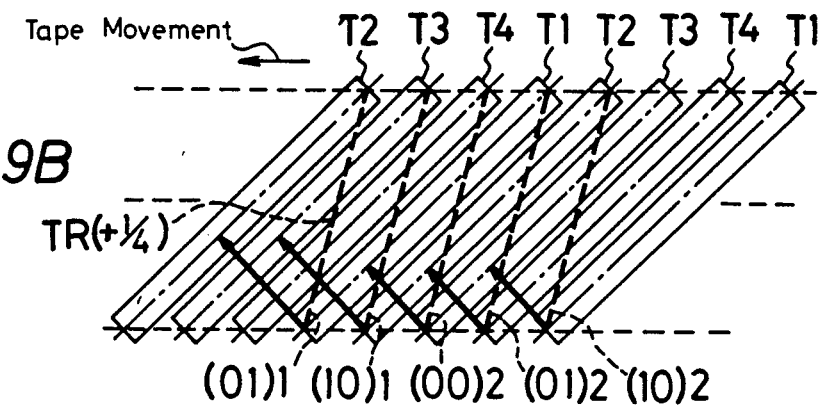

FIGS. 9A and 9B respectively illustrate the state in which the mode is moved to the normal mode from a transient state when, for example, the playback mode is changed over from the still mode to the mode with tape speed +¼ times the normal tape speed. For example, if the displacement start position exceeds the lower limit displacement DL in the tracings of more than twice, the jump control circuit 11 detects this state and decreases the jump amount from −3T to −2T when the tracking track information TTI changes from "10" to "11".

When the tracking track information TTI sequentially specifies the tracking tracks to be tracked in the order of (01)1, (10)1, (00)2, (01)2, (10)2, . . . as shown in FIG. 9A, since the tracing of the track T1 specified by the tracing locus (00)2 after the DT head jumped two tracks skips the preceding track T4 as shown in FIG. 9B, the zero displacement tracing locus TR(+¼) of the DT head can be returned inside the tolerance range by the displacement amount displaced from the tolerance range.

Hence the mode can enter the stable playback mode with tape speed +¼ times the normal tape speed from the still mode.

Figure 10A:
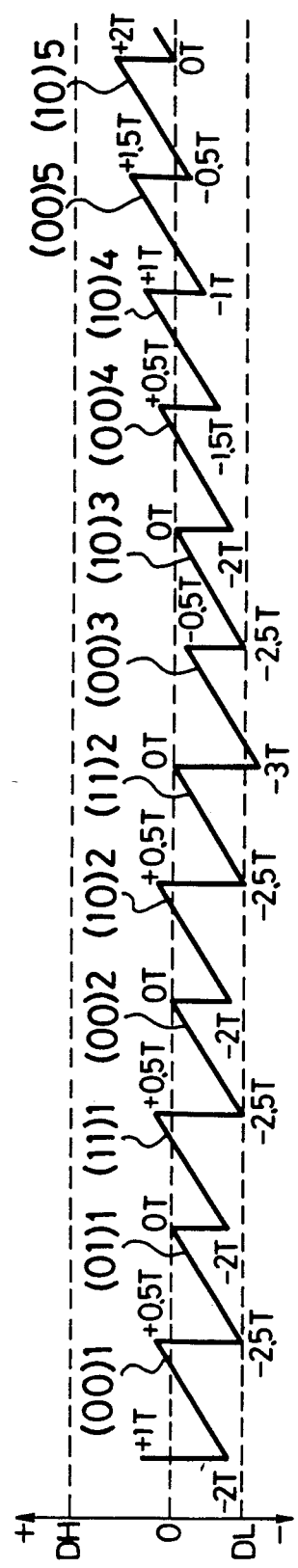

(4) Playback mode with tape speed +¼ times the normal tape speed to playback mode with tape speed +½ times the normal tape speed In the case where the tape runs at, for example, tape speed +⅜ times the normal tape speed, when the tracking track information TTI specifies sequentially the tracks to be tracked dynamically in the order of (00)1, (01)1, (11)1, (00)2, (10)2, (11)2, (00)3, (10)3, (00)4, (10)4, (00)5, (10)5, . . . as shown in FIG. 10A, the tape is transported in the positive direction by 1.5 track amounts during one tracing of the DT head so that the zero displacement tracing locus TR(+⅜) of the DT head sequentially forms the tracing locus each having an interval of 1.5 tracks and which crosses the recording track of 2.5 track amounts.

At that time, the jump control circuit 11 makes the track jump amount as 2 tracks (−2T) when the displacement of the DT head exceeds the lower limit displacement DL and then changes the jump amount to 3 tracks (−3T) when the displacement amount of the DT head exceeds the upper limit displacement DH thereafter. Thus, the displacement amount of the DT head can always lie within the range from the upper limit displacement DH to the lower limit displacement DL.

In the embodiment of the invention, such a condition is pre-determined that when the tracking track information TTI becomes the logic "11" to specify the third track T3, the 2-track jump can not be changed even if the displacement amount of the DT head gets over the lower limit displacement DL. Accordingly, only when the displacement amount of the DT head gets over the lower limit displacement DL more than twice, the track jump amount can be changed from 3-track jump to the 2-track jump.

Figure 10B:
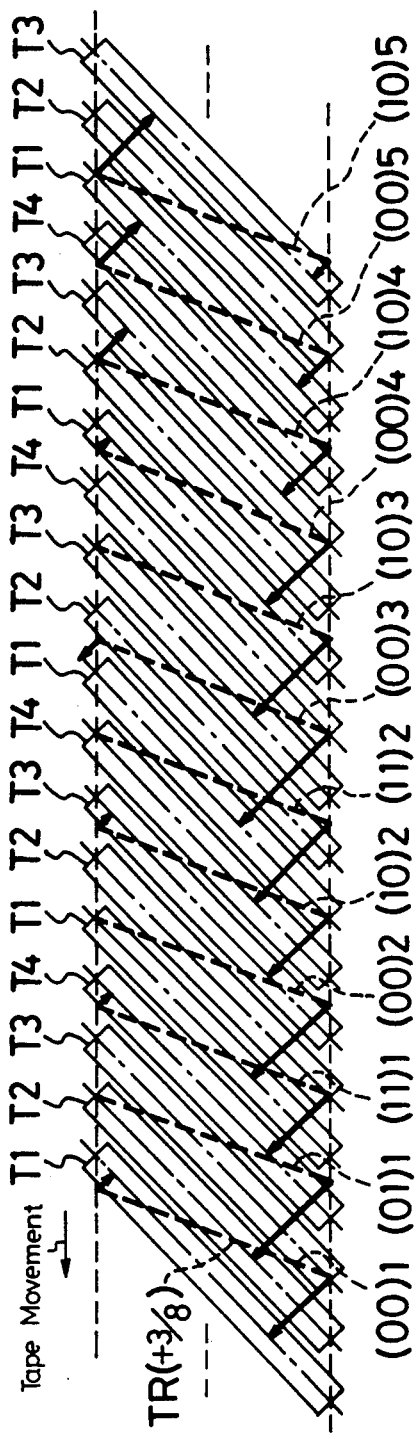

In this way, as shown in FIG. 10B, the jump amount of the DT head may be properly 2-or 3-track jump and the DT head can trace all the corresponding tracks so that it is possible to reproduce the video signal from the corresponding track positively.

(5) Playback mode with tape speed +½ times the normal tape speed

Figure 11A:
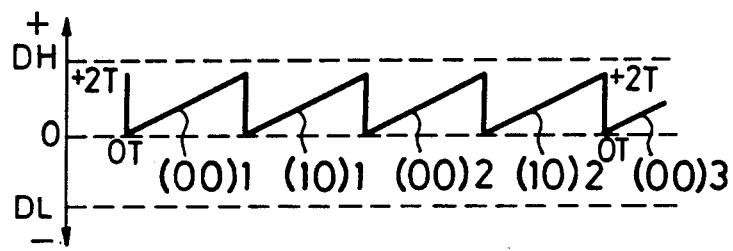
Figure 11B:
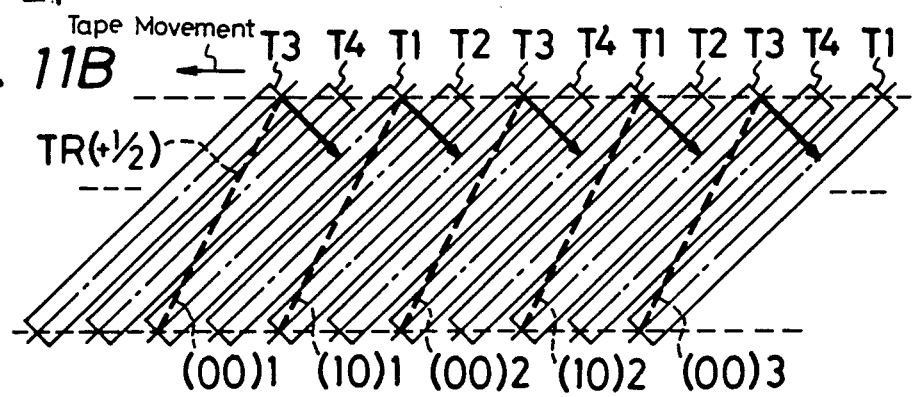

In this case, during one tracing of the DT head, the tape is transported in the positive direction by 2-track amounts. Accordingly, the zero displacement tracing locus TR(+½) of the DT head sequentially forms the tracing locus having the 2-track interval and which crosses the recording track of 2 track amounts as shown in FIG. 11B. In order that the corresponding track "00" and the adjacent track "10" with one track therebetween can be alternately and sequentially specified, the tracking track information TTI, as shown in FIG. 11A, sequentially specifies the tracks to be dynamically tracked in the sequential order of (00)1, (10)1, (00)2, (10)2, (00)3, . . . Then, the jump control circuit 11 specifies the 2-track jump.

Consequently, as shown in FIG. 11B, the video signal can be reproduced from the corresponding track T1 by every other tracing and hence by only displacing the DT head by the displacement amount of 2-track amounts, the video signals reproduced from all the corresponding tracks can be stored in the field memory 8.

(6) Playback mode with tape speed $+\frac{1}{2}$ to $+\frac{3}{4}$ times the normal tape speed For example, let us consider the playback mode with tape speed $\frac{5}{8}$ times the normal tape speed. At every time when the DT head performs one tracing, the tape is transported in the positive direction by 2.5 tracks so that the zero displacement tracing locus TR$(+\frac{5}{8})$ of the DT head is sequentially formed with an interval of 2.5 tracks and which cross the recording track of 1.5 tracks as shown in FIG. 12B.

In this case, the tracking track information TTI specifies the corresponding track T1 and the adjacent track T2 with one track therebetween as shown in FIG. 12A. In other words, the tracking track information TTI specifies the recording tracks in the sequential order of (00)1, (10)1, (00)2, (10)2, (00)3, (00)4, (00)5, (00)6, (01)6, . . .

In accordance therewith, the jump control circuit 11 specifies the 2-track jump when the displacement amount of the DT head approaches the lower limit displacement DL and then specifies the track jump amount of zero when it detects that the displacement amount of the DT head exceeds the lower limit displacement DL.

Accordingly, the displacement amount of the DT head changes from the lower limit displacement DL to the upper limit displacement DH and then exceeds the upper limit displacement DH. At that time, the jump control circuit 11 detects that the DT head exceeds the upper limit displacement DH and changes the jump track amount to the 2-track jump (that is, $-2T$). Then, the displacement amount of the DT head changes from the upper limit displacement DH to the lower limit displacement DL.

Hereinbelow similarly, the displacment amount of the DT head can be changed within the tolerance range since the jump control circuit 11 changes the jump amount to 2-track jump or to zero-track jump.

In consequence, while the DT head carries out the 2-track jump the DT head can reproduce the video signal from the corresponding track T1 by every other tracing, whereas when the DT head carries out the zero-track jump, it can reproduce the video signal from the corresponding track T1 at every tracing. Accordingly, also in this case, under the state that the displacement amount of the DT head is relatively small, the video signal data reproduced from the corresponding track T1 can be stored in the field memory 8 positively.

(7) Playback mode with tape speed $+\frac{3}{4}$ times the normal tape speed

Figure 13A:
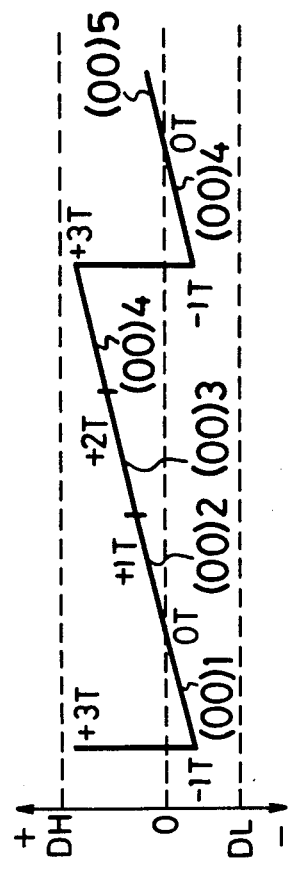
Figure 13B:
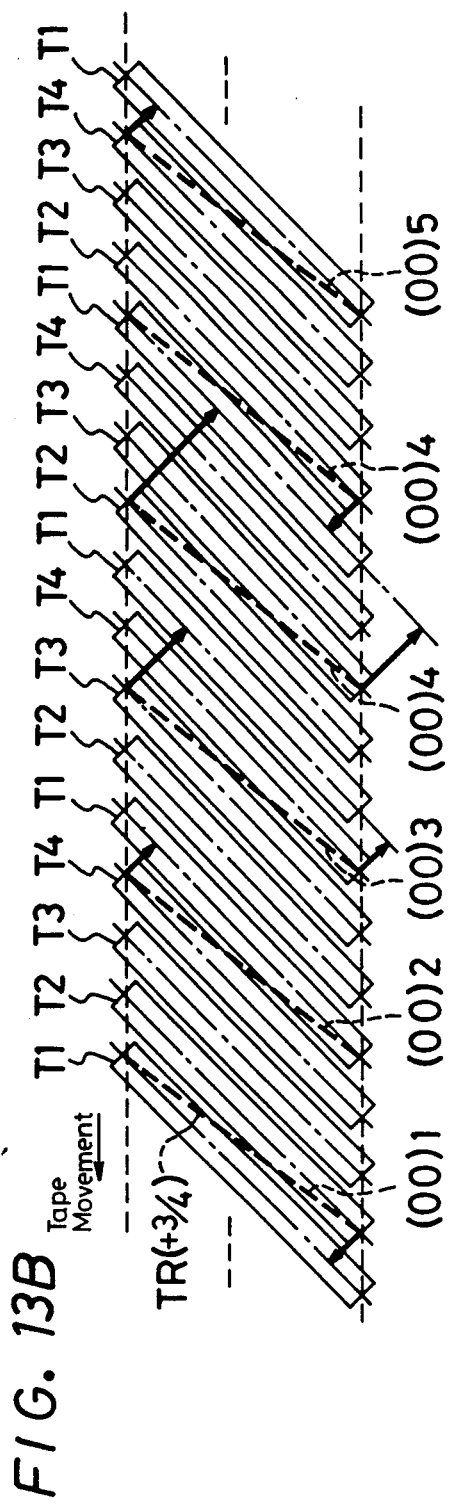

In this playback mode, during every one tracing of the DT head, the tape is transported in the positive direction by 3 track amounts so that the zero displacement tracing locus TR$(+\frac{3}{4})$ of the DT head is sequentially formed with an interval of 3 tracks and so as to cross the recording track of one track amount as shown in FIG. 13B. At that time, the tracking track information TTI specifies only the corresponding tracks as shown in FIG. 13A. In other words, the tracking track information TTI sequentially specifies (00)1, (00)2, (00)3, (00)4, (00)4, (00)5, . . .

In accordance therewith, the jump control circuit 11 carries out the zero track jump (that is, 0T) during a period in which the DT head performs four tracings continuously and controls the DT head so as to carry out the 4-track jump (that is, $-4T$) each time the four tracings are finished.

Consequently, since the DT head traces the same track in the next tracing after the DT head carried out the 4-track jump, it is possible to prevent the displacemnt amount of the DT head from exceeding the upper limit displacement DH. As a result, the video signal data reproduced from all the corresponding tracks T1 can be stored positively in the field memory 8 by the displacement amount of the DT head which is small as compared with the tolerance range.

Figure 14A:
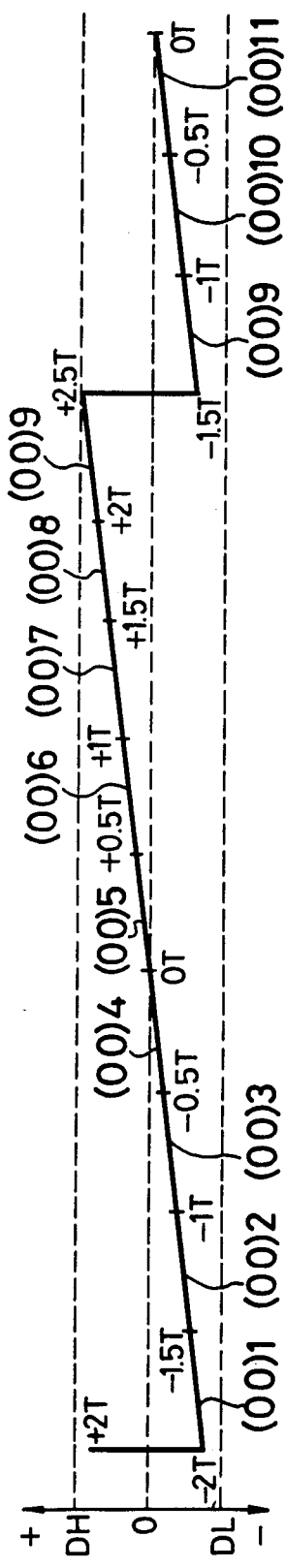
Figure 14B:
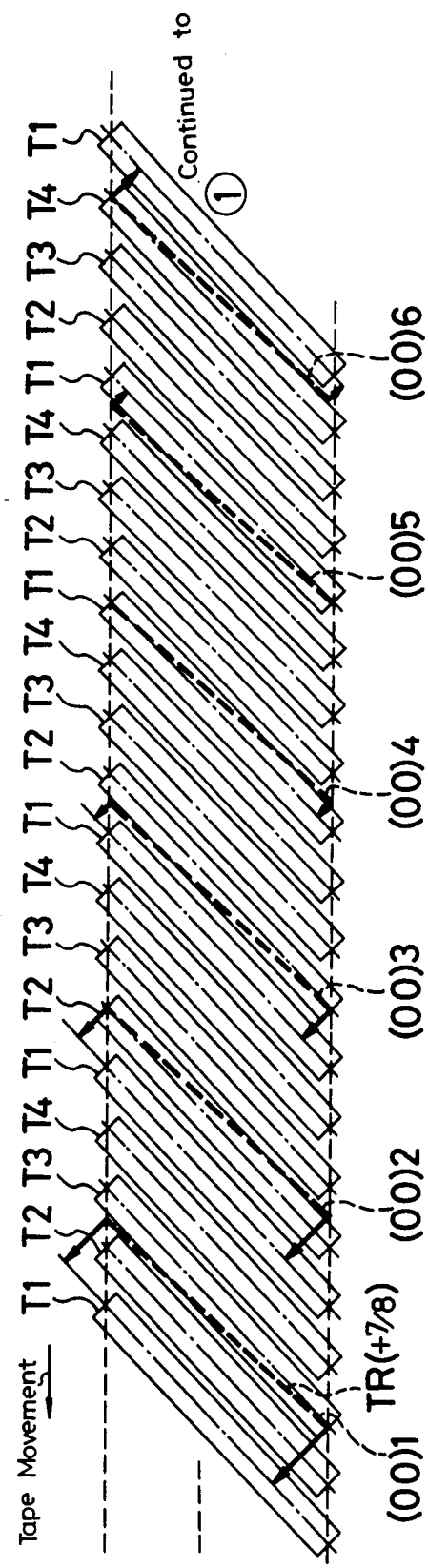
Figure 14B:
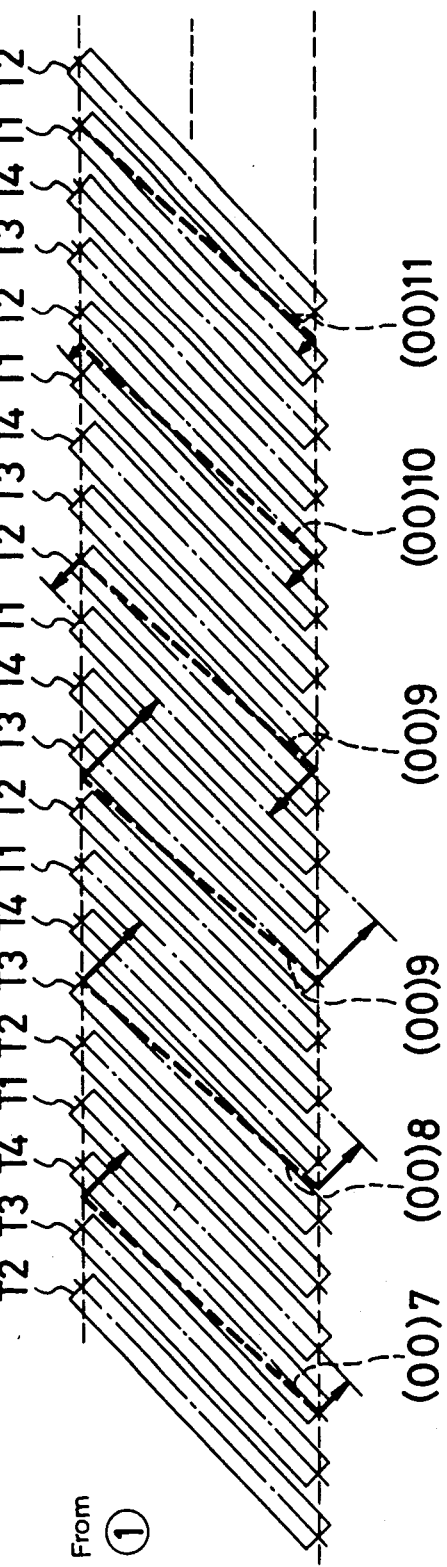

(8) Playback mode with tape speed $+\frac{3}{4}$ to $+1$ times the normal tape speed For example, let us consider the playback mode with tape speed $+\frac{7}{8}$ times the normal tape speed. At that time, at every time the DT head carries out one tracing, the tape is transported in the positive direction by 3.5 tracks. Accordingly, the zero displacement tracing locus TR$(+\frac{7}{8})$ of the DT head sequentially forms the tracing loci having an interval of 3.5 tracks and which cross the recording track by 0.5 tracks as shown in FIG. 14B. At that time, the tracking track information TTI specifies the corresponding track "00" at every tracing as shown in FIG. 14A. Then, during a tracings of the DT head in which the displacement amount of the DT head does not exceed the upper limit displacement DH, the jump control circuit 11 specifies the zero-track jump and then specifies the 4-track jump ($-4T$) when the displacement amount of the DT head reaches the upper limit displacement DH.

Consequently, the displacement of the DT head when the DT head carries out the 4-track jump is returned from $+3.5T$ to $-1.5T$ and this operation will be repeated hereinbelow.

Accordingly, also in this case, it is possible to store the video signal data reproduced from all the corresponding tracks T1 in the field memory 8 by displacing the DT head by a small value within the tolerance range.

(9) Playback mode with tape speed $+1$ to $+1.5$ times the normal tape speed

For example, let us consider the playback mode with tape speed $+1.25$ times the normal tape speed. In this case, at every time the DT head carries out one tracing, the tape is transported by 5-track amounts. Accordingly, the zero displacement tracing locus TR$(+1.25)$ of the DT head sequentially formes the tracing loci having an interval of 5 tracks and which cross the recording track by one track amount, as shown in FIG. 15B.

At that time, the tracking track information TTI specifies the corresponding track "00" at every tracing as shown in FIG. 15A. Then, the jump control circuit 11 commands the zero track jump (0T) during the time when four tracing are carried out continuously and then commands 4-track jump in the reverse direction (that is, $+4T$) each time the four tracing operations with the zero-track jump are ended. As a result, since at every tracing the DT head is displaced four times from the upper limit displacement DH to the lower limit displacement DL by one track each and then is returned to the original displacement the DT head can store the necessary video signal data reproduced from the corresponding track T1 in the field memory 8 while maintaining the displacement within the tolerance range.

In this case, since the tape speed exceeds the normal playback tape speed, it is not necessary to reproduce the video signals of all the corresponding tracks T1 but the video signal is reproduced under the condition that as shown in FIG. 15B, one corresponding track (00)5 is skipped upon the 4-track jump operation.

(10) Still mode to playback mode with tape speed $-\frac{1}{4}$ times the normal tape speed For example, let us consider the playback mode with tape speed $-\frac{1}{8}$ times the normal tape speed. In this case, during the time the DT head achieves one tracing, the tape is transported in the reverse direction by $\frac{1}{8}$ track amount as shown in FIG. 16B. Accordingly, contrary to the case in which the tape is transported in the forward direction, the zero displacement tracing locus TR($-\frac{1}{8}$) of the DT head is sequentially formed with $\frac{1}{2}$ track interval so as to cross the recording track by 4.5 track amounts from the right-hand side to the left-hand side.

Figure 16A:
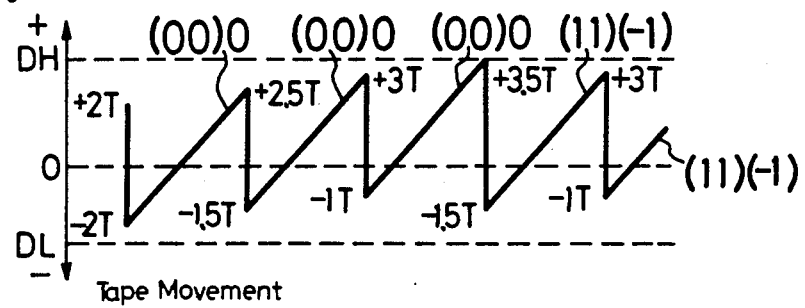
Figure 16B:
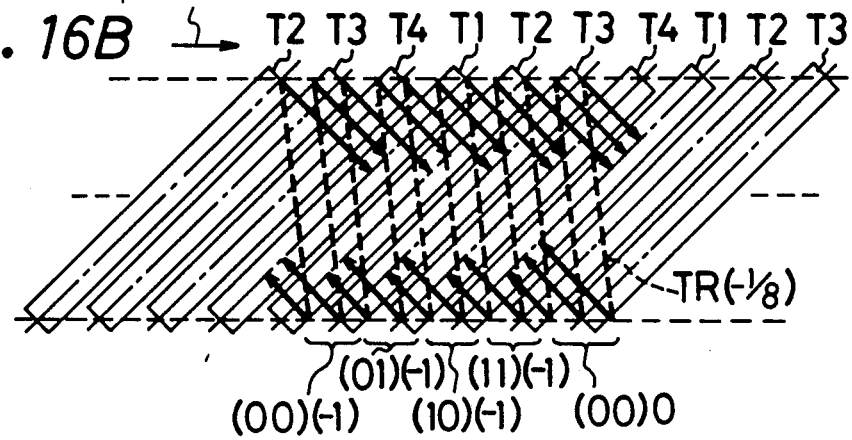

Then, the tracking track information TTI specifies sequentially the right-hand side tracks in the order of (00)0, (00)0, (00)0, (11)(−1), (11)(−1), . . . as shown in FIG. 16A.

Accordingly, the DT head carries out the dynamic tracking operation such that after it traces the track T1 three times, it sequentially traces the adjacent tracks T4, T3, T2, T1, . . . twice each. As a result, the video signal obtained when the DT head traces the corresponding track T1 is stored in the field memory 8.

(11) Playback mode with tape speed $-\frac{1}{4}$ times the normal tape speed

Figure 17A:
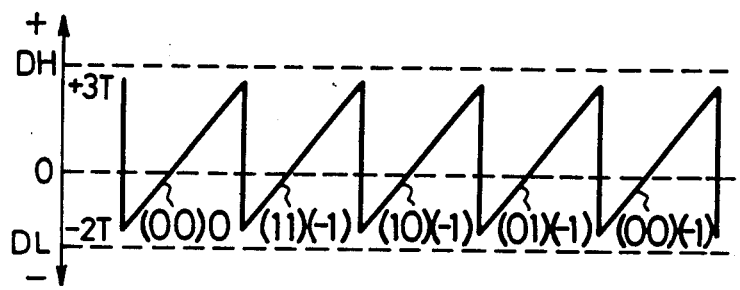
Figure 17B:
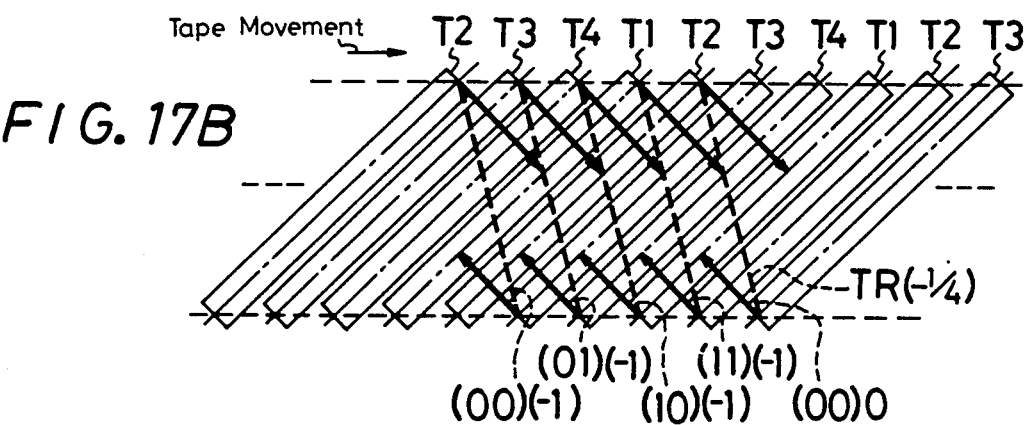

In this case, during the time when the DT head performs one tracing, the tape is transported in the reverse direction by one track amount. Accordingly, the zero displacement tracing locus TR($-\frac{1}{4}$) of the DT head is sequentially formed as the tracing locus having an interval of one track and which crosses the recording track by 5-track amounts in the left-hand direction as shown in FIG. 17B. Then, the tracking track information TTI sequentially specifies the tracks in the order of the adjacent tracks T1, T4, T3, T2, T1 just like (00)0, (11)(−1), (10)(−1), (01)(−1), (00)(−1) as shown in FIG. 17A.

Consequently, as shown in FIG. 17B, it is possible to store in the field memory 8 the video signal data which is reproduced when the DT head traces the corresponding track T1 in the dynamic tracking mode.

(12) Playback mode with tape speed $-\frac{1}{4}$ to $-\frac{1}{2}$ times the normal tape speed For example, let us consider the playback mode with tape speed $-\frac{3}{8}$ times the normal tape speed. At that time, at every time the DT head carries out one tracing, the tape is transported in the reverse direction by 1.5 tracks as shown in FIG. 18B. Accordingly, the zero displacement tracing locus TR($-\frac{3}{8}$) of the DT head is formed sequentially in the left-hand direction as the tracing loci having an interval of 1.5 tracks in the left-hand direction and which cross the recording track by 5.5 track amounts.

Figure 18A:
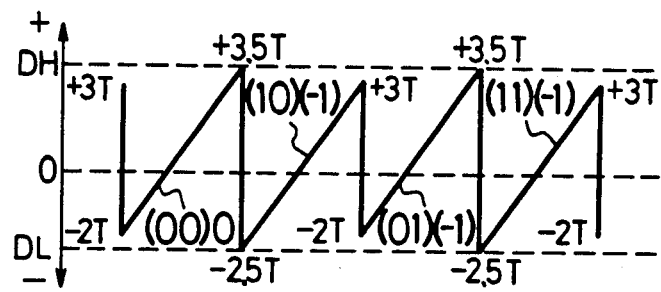
Figure 18B:
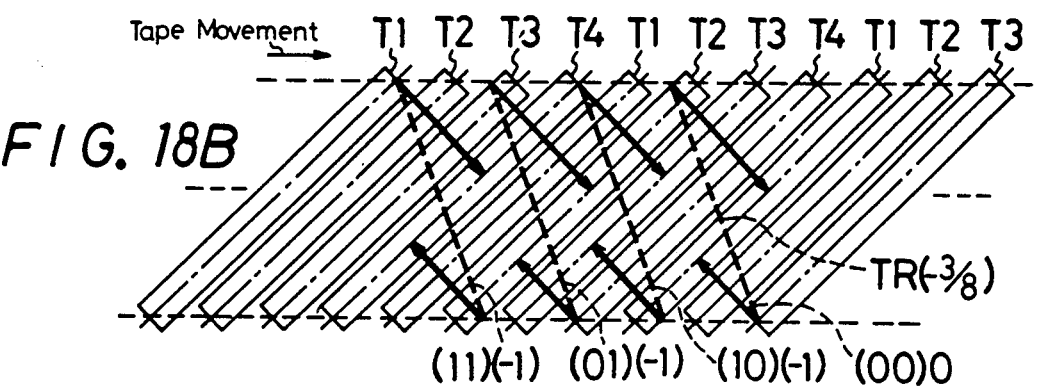

Then, the tracking track information TTI specifies the tracks to be dynamically tracked in the order of (00)0, (10)(−1), (01)(−1), (11)(−1), . . . sequentially as shown in FIG. 18A.

As set forth above, according to the present invention, since each time the DT head traces the recording track, the track to be traced is specified and the displacement amount of the DT head relative to the specified track is determined, the DT head can positively trace the corresponding track in the dynamic tracking mode while being displaced by a displacement amount within the tolerance displacement amount at all times. Consequently, even when the tape speed is varied in a wide range such as the shuttle mode, it is possible to obtain the reproduced video signal which can be satisfied in practice sufficiently.

The above description is given on the preferred embodiments of the invention but it will be apparent that many modifications and variations could be effected by one skilled in the art without departing from the spitirs or scope of the novel concepts of the invention so that the scope of the invention should be determined by the appended claims only.

What is claimed is:

1. A slow motion reproducing apparatus employing a record medium having tracks for recording video signals, said apparatus comprising:
    (a) dynamic tracking head repeatedly scanning said recording medium in a direction along said tracks for reproducing the video signals from said successive tracks of said medium;
    (b) head deflecting means responsive to drive signals for deflecting said dynamic tracking head in a direction transverse to the direction of said tracks;
    (c) address generator to generating a write address signal indicative of the start address of each horizontal scanning line;
    (d) video signal memory for storing the video data of one horizontal scanning line at its address which sequentially increments from the above write address signal;
    (e) head position information generator for specifying the track that the dynamic tracking head now traces and for generating a head position information;
    (f) record medium speed information generator for specifying the predetermined speed of said record medium and generating speed signals in response thereto;
    (g) head displacement amount specifying means for specifying a dynamic tracking head displacement amount so as to make the dynamic tracking head trace the specified track on the basis of said head position information and record medium speed information to supply said drive signals to said head deflecting means;
wherein said video signal memory storing the video signal data at its memory area corresponding to a corresponding track, which can be reproduced from the corresponding track and which is recorded on the track that said dynamic tracking head traces.

2. A slow motion reproducing apparatus as claimed in claim 1, wherein said recording video signals is the component video signals which are recorded on said tracks individually.

3. A slow motion reproducing apparatus as claimed in claim 2, wherein said tracks comprising four tracks which are assigned to red signal, blue signal, first green signal and second green signal.

4. A slow motion reproducing apparatus as claimed in claim 1, wherein said tracks including the synchronizing signal recording area in which the vertical synchronizing signal being recorded in the end portion of said tracks for being generated the head position information.

5. A slow motion reproducing apparatus as claimed in claim 4, wherein said synchronizing signal recording area locates at least in the lower end edge or upper end edge of said tracks.

6. A slow motion reproducing apparatus as claimed in claim 1, wherein said video signal memory is one field video memory which is adapted to sequentially write therein a video data of one horizontal scanning line.

7. A slow motion reproducing apparatus as claimed in claim 1, wherein said head deflecting means having a bimorph leaf.

8. A slow motion reproducing apparatus as claimed in claim 1, wherein said recording medium is a magnetic tape.

9. A slow motion reproducing apparatus as claimed in claim 1, further comprising the read address signal circuit for reading out the video signal from said video signal memory cyclicaly for reproducing the slow motion video signal.

* * * * *